US011954865B2

(12) United States Patent
Yamauchi

(10) Patent No.: US 11,954,865 B2
(45) Date of Patent: Apr. 9, 2024

(54) IMAGE PROCESSING APPARATUS, IMAGE PROCESSING METHOD, AND STORAGE MEDIUM FOR FOREGROUND EXTRACTION

(71) Applicant: CANON KABUSHIKI KAISHA, Tokyo (JP)

(72) Inventor: Shohei Yamauchi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 62 days.

(21) Appl. No.: 17/226,121

(22) Filed: Apr. 9, 2021

(65) Prior Publication Data

US 2021/0366129 A1 Nov. 25, 2021

(30) Foreign Application Priority Data

May 20, 2020 (JP) ................................. 2020-088126

(51) Int. Cl.
*G06T 7/194* (2017.01)
*G06T 7/136* (2017.01)
*G06T 7/174* (2017.01)

(52) U.S. Cl.
CPC .............. *G06T 7/194* (2017.01); *G06T 7/136* (2017.01); *G06T 7/174* (2017.01); *G06T 2207/20081* (2013.01); *G06T 2207/20224* (2013.01)

(58) Field of Classification Search
CPC .................. G06T 7/194; G06T 7/7136; G06T 2207/20081; G06T 2207/20084; G06T 7/174; G06T 7/143; G06T 2207/10016; G06T 7/254; G06T 7/11; G06T 15/205; G06T 2207/20224; G06T 2207/10024; G06T 7/136; G06T 2207/20076; G06T 2207/30196; G06T 2207/30232; G06T 7/73; G06T 7/12; G06T 7/215; G06T 11/60; G06T 2207/10028; G06T 2207/20132;
(Continued)

(56) References Cited

U.S. PATENT DOCUMENTS 10,614,736 B2 * 4/2020 Van Droogenbroeck ................... G06T 7/194
11,074,742 B2 * 7/2021 Matsushita ............. G06T 15/20
(Continued)

FOREIGN PATENT DOCUMENTS

CN 111160099 A * 5/2020 ......... G06K 9/00718
JP 2018-147329 A 9/2018

OTHER PUBLICATIONS

Zeng, Dongdong, et al. "Background subtraction with real-time semantic segmentation." IEEE Access 7 (2019): 153869-153884. (Year: 2019).*
(Continued)

*Primary Examiner* — Ian L Lemieux
(74) *Attorney, Agent, or Firm* — Carter, DeLuca & Farrell LLP

(57) ABSTRACT

An image processing apparatus determines, based on results of extracting a foreground area from a captured image by learning, a threshold value that is used for generation of a foreground image based on a difference between the captured image and a background image corresponding to the captured image. The image processing apparatus generates a foreground image based on a difference between the captured image and the background image by using the determined threshold value.

9 Claims, 8 Drawing Sheets

(58) Field of Classification Search
CPC . G06T 2207/20156; G06T 7/187; G06T 7/90; G06T 11/001; G06T 15/20; G06T 17/20; G06T 2207/30201; G06T 7/277; G06T 11/40; G06T 2200/24; G06T 2207/10048; G06T 2207/10072; G06T 2207/10144; G06T 2207/20021; G06T 2207/20041; G06T 2207/30221; G06T 2207/30056; G06T 2207/30228; G06T 2207/30244; G06T 3/4038; G06T 5/50; G06T 7/155; G06T 7/162; G06T 7/181; G06T 7/251; G06T 7/70; G06T 17/00; G06T 19/00; G06T 2207/10052; G06T 2207/20016; G06T 2207/20052; G06T 5/002; G06T 5/20; G06T 5/40; G06T 7/30; G06T 40/161; G06T 10/46; G06T 10/7515; G06T 10/82; G06T 30/19173; G06N 3/02–088; G06N 3/045; G06N 3/09; G06V 10/82; G06V 30/274; G06V 40/10; G06V 10/25; G06V 10/30; G06V 10/454; G06V 10/50; G06V 10/60; G06V 10/764; G06V 10/772; G06V 10/776; G06V 10/809; G06V 10/993; G06V 20/40; G06V 20/42; G06V 20/647; G06V 40/103; G06V 40/164; G06V 40/171; H04N 13/117; H04N 13/279; H04N 5/272

See application file for complete search history.

(56) References Cited

U.S. PATENT DOCUMENTS

| | | | |
|---|---|---|---|
| 2009/0087096 A1* | 4/2009 | Eaton | G06V 10/28 382/190 |
| 2010/0098331 A1* | 4/2010 | Meng | G06T 7/194 382/164 |
| 2011/0243383 A1* | 10/2011 | Oyaizu | G06T 7/194 382/103 |
| 2015/0221066 A1* | 8/2015 | Kobayashi | G06T 3/4038 382/284 |
| 2018/0174301 A1* | 6/2018 | Loui | G06T 7/12 |
| 2019/0197696 A1* | 6/2019 | Van Droogenbroeck | G06T 7/194 |
| 2020/0372659 A1* | 11/2020 | Hagiopol | G06T 7/194 |

OTHER PUBLICATIONS

Bouwmans, Thierry, et al. "Deep neural network concepts for background subtraction: A systematic review and comparative evaluation." Neural Networks 117 (2019): 8-66. (Year: 2019).*

* cited by examiner

IMAGE PROCESSING APPARATUS, IMAGE PROCESSING METHOD, AND STORAGE MEDIUM FOR FOREGROUND EXTRACTION

BACKGROUND

Field

The present disclosure relates to image processing

Description of the Related Art

A method of extracting an object image on which attention is focused from an image captured by an image capturing apparatus, such as a camera, is used for a variety of purposes and there are a variety of kinds of method. For example, there is a background difference method of extracting a pixel whose pixel value difference is larger than or equal to a predetermined threshold value as a foreground area by comparing an input image and a background image. In the background difference method, the change in the pixel value of each pixel in a plurality of frames is observed and in a case where the change is smaller than or equal to a predetermined threshold value, the pixel is taken in into the background image. Then, the input image and the background image are compared for each frame and the pixel whose pixel value difference is larger than or equal to a predetermined threshold value is extracted as the background area. However, the appropriate value of this threshold value varies depending on the illumination condition at the time of image capturing. In order to solve this problem, Japanese Patent Laid-Open No. 2018-147329 has disclosed a technique to appropriately change the threshold value by making use of at least one of the luminance value and the illuminance of the input image.

SUMMARY

However, with the technique disclosed in Japanese Patent Laid-Open No. 2018-147329, it is not possible to determine whether the threshold value that is changed based on at least one of the luminance value and the illuminance of the input image is an appropriate value. Because of this, in a case where there is an error between the changed threshold value and an appropriate threshold value, the extraction accuracy of a foreground area is reduced.

Consequently, in view of the above-described problem, various embodiments of the present disclosure is directed to a technique for accurately extracting a foreground area.

According to one embodiment of the present disclosure, an image processing apparatus determines, based on results of extracting a foreground area from a captured image by learning, a threshold value that is used for generation of a foreground image based on a difference between the captured image and a background image corresponding to the captured image; and generates a foreground image based on a difference between the captured image and the background image by using the determined threshold value.

Further features of the present disclosure will become apparent from the following description of exemplary embodiments with reference to the attached drawings.

DESCRIPTION OF THE EMBODIMENTS

In the following, with reference to the drawings, embodiments are explained. Configurations shown in the following embodiments are merely exemplary and the present disclosure is not limited to the configurations shown schematically. Further, a virtual viewpoint image is an image that is generated based on the position, the orientation and the like of a virtual camera different from a real camera and also called a free-viewpoint image or an arbitrary viewpoint image. Further, in the following explanation, there is a case where an image refers to image data representing the image.

First Embodiment

In the present embodiment, based on results of evaluating a foreground silhouette image for which foreground area extraction by the background difference method has been performed by using a foreground silhouette image for which foreground area extraction by machine learning has been performed, a threshold value that is used in the background difference method is determined appropriately. Due to this, even in an image capturing environment in which a change in illumination occurs, it is possible to generate a foreground silhouette image of high accuracy.

<Hardware Configuration of Image Processing Apparatus>

Figure 1:
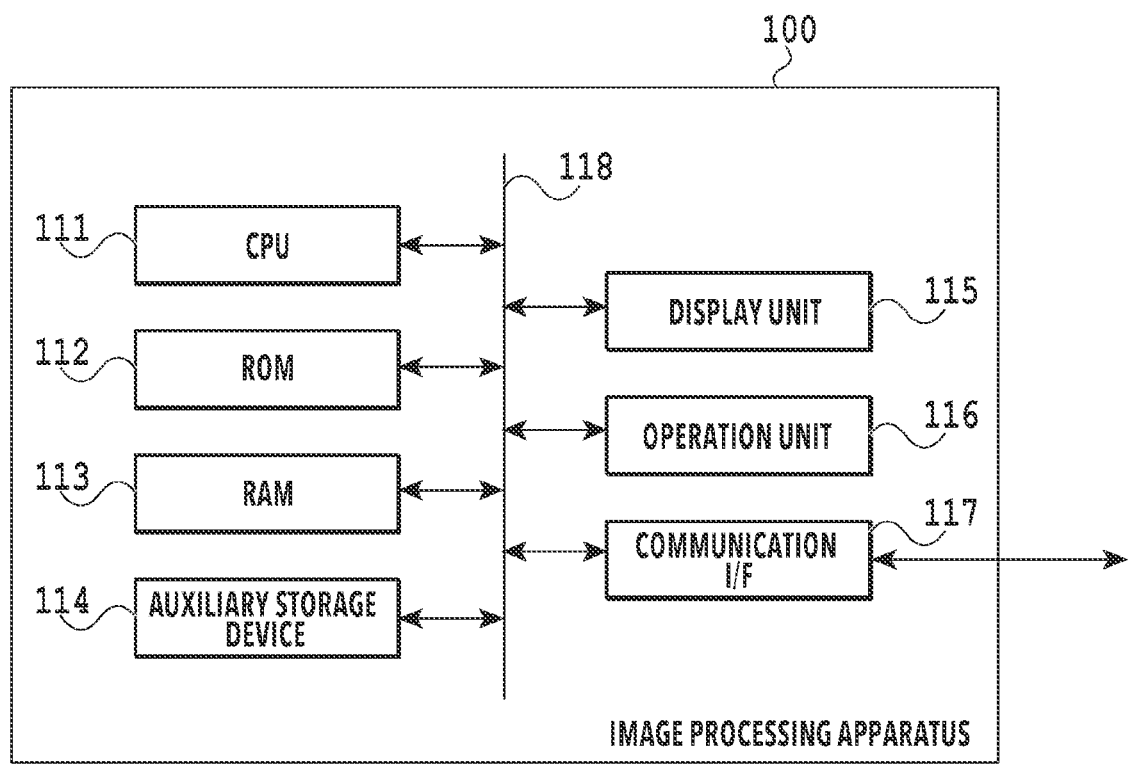
FIG. 1 is a block diagram showing a hardware configuration of an image processing apparatus 100 according to a first embodiment.

FIG. 1 is a block diagram showing a hardware outline configuration of an image processing apparatus 100 according to the present embodiment. The image processing apparatus 100 is specifically an information processing apparatus, such as a PC, and has a CPU 111, a ROM 112, a RAM 113, an auxiliary storage device 114, a display unit 115, an operation unit 116, a communication I/F 117, and a bus 118.

Figure 2:
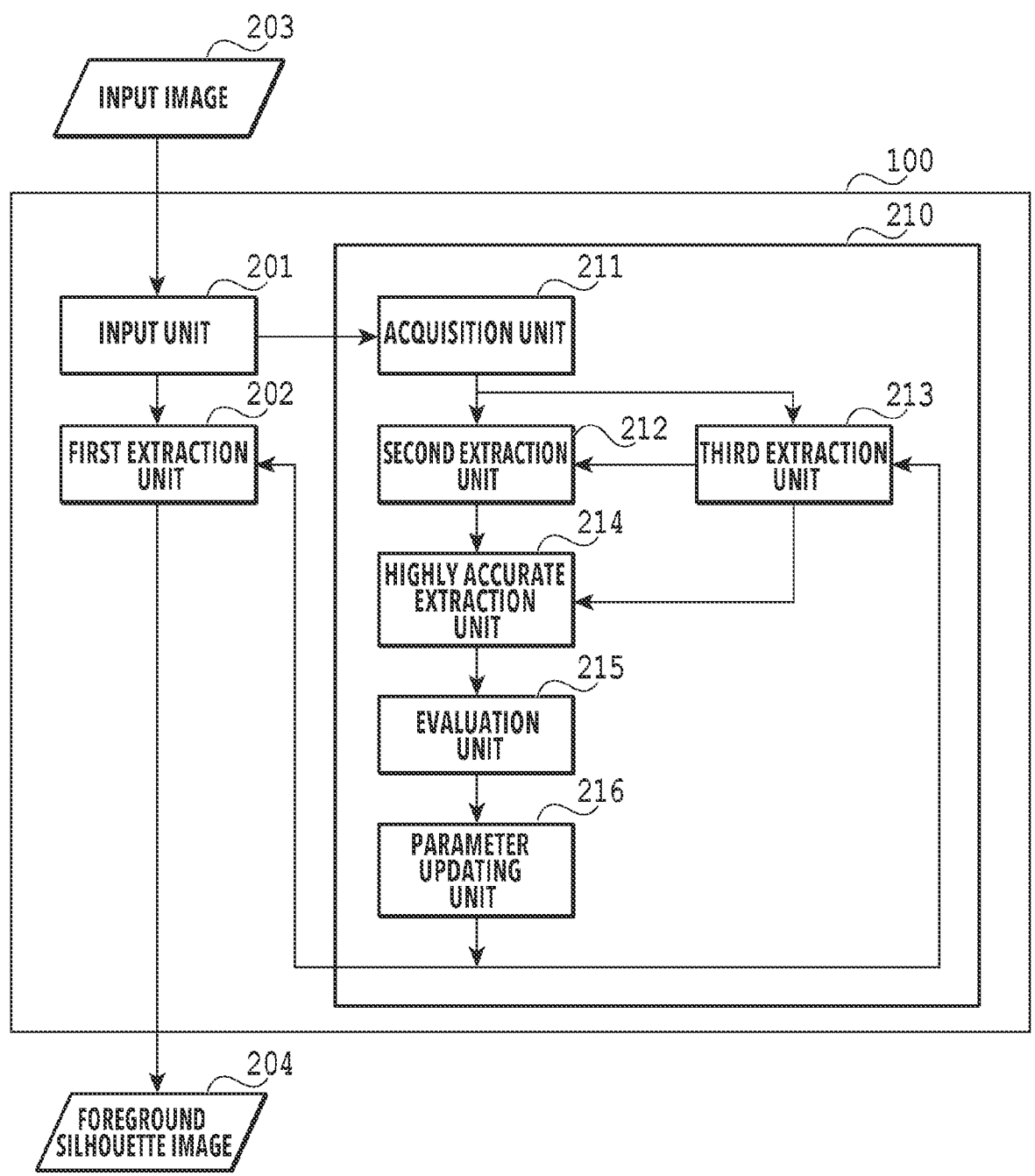
FIG. 2 is a block diagram showing a function configuration of the image processing apparatus 100 in the first embodiment.
Figure 3A:
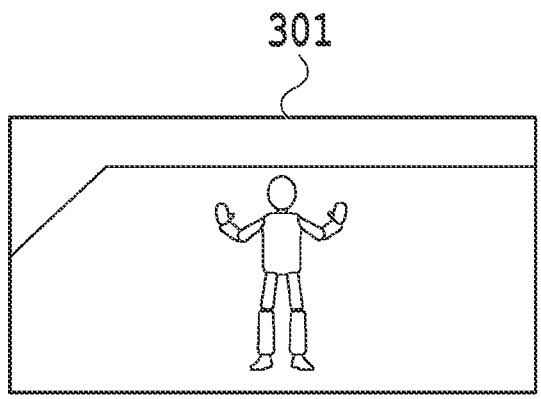
FIG. 3A to FIG. 3D are explanatory diagrams of foreground area extraction by an extraction unit in the first embodiment.
Figure 3B:
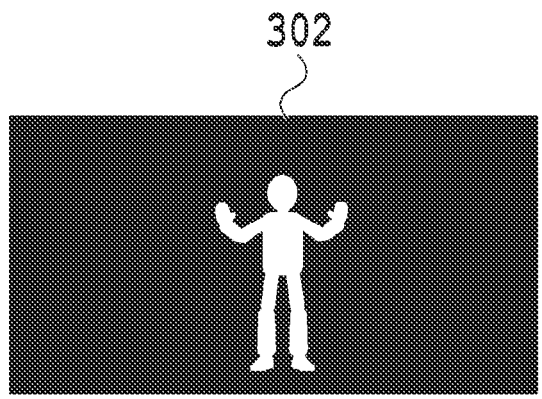
Figure 3C:
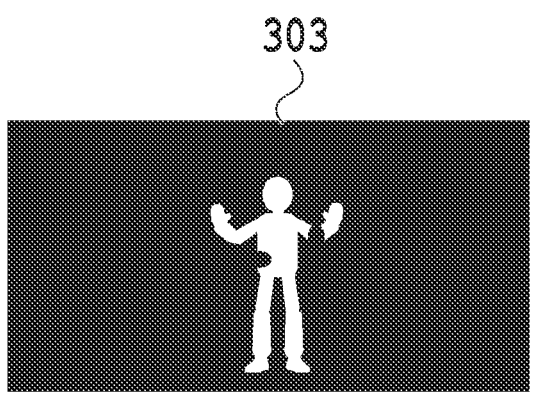
Figure 3D:
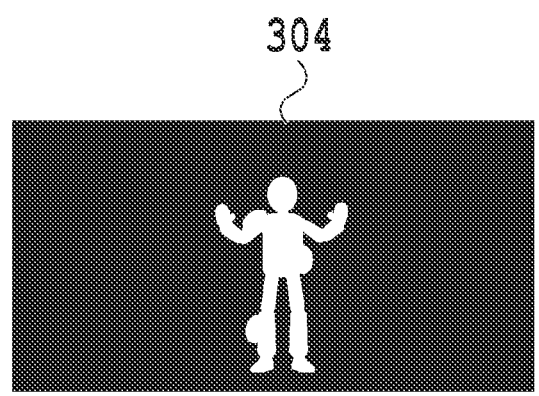

The CPU 111 implements each function of the image processing apparatus 100 shown in FIG. 2 by controlling the entire image processing apparatus 100 using computer programs and data stored in the ROM 112 and the RAM 113. The image processing apparatus 100 may have one or a plurality of pieces of dedicated hardware different from the CPU 111 and at least part of the processing by the CPU 111 may be performed by the dedicated hardware. As the example of the dedicated hardware, there are an ASIC (Application-Specific Integrated Circuit), an FPGA (Field Programmable Gate Array), a DSP (Digital Signal Processor) and the like.

In the ROM 112, programs and the like that do not need to be changed are stored. In the RAM 113, programs and data that are supplied from the auxiliary storage device 114, data that is supplied from the outside via the communication I/F 117, and the like are stored temporarily. The auxiliary storage device 114 has, for example, a hard disk drive and the like and in the auxiliary storage device 114, various kinds of data, such as image data and voice data, are stored.

The display unit 115 has, for example, a liquid crystal display, an LED and the like and displays a GUI (Graphical User Interface) for a user to operate the image processing apparatus 100, and the like. The operation unit 116 has, for example, a keyboard, a mouse, a joystick, a touch panel and the like and inputs various instructions to the CPU 111 in response to the operation by a user. The CPU 111 operates as a display control unit configured to control the display unit 115 and an operation control unit configured to control the operation unit 116.

The communication I/F 117 is used for communication with an external device of the image processing apparatus 100. For example, in a case where the image processing apparatus 100 is connected with an external device in a wired manner, a cable for communication is connected to the communication I/F 117. In a case where the image processing apparatus 100 has a function to perform wireless communication with an eternal device, the communication I/F 117 comprises an antenna. The bus 118 connects each unit of the image processing apparatus 100 and transmits information.

In the present embodiment, the display unit 115 and the operation unit 116 exist inside the image processing apparatus 100, but at least one of the display unit 115 and the operation unit 116 may exist outside the image processing apparatus 100 as another unit.

<Function Configuration of Image Processing Apparatus>

FIG. 2 is a block diagram showing the function configuration (software configuration) of the image processing apparatus 100 in the present embodiment. The image processing apparatus 100 is an image processing apparatus that takes an input image 203 as an input, which is a target of foreground area extraction, and outputs a first foreground silhouette image 204, which is extraction results of a foreground area.

The image processing apparatus 100 has an input unit 201, a first extraction unit 202, and a parameter adjustment unit 210. The parameter adjustment unit 210 has an acquisition unit 211, a second extraction unit 212, a third extraction unit 213, a highly accurate extraction unit 214, an evaluation unit 215, and a parameter updating unit 216.

The input unit 201 has a function to receive the input image 203, which is a target from which a captured foreground area is extracted. The input unit 201 may be a unit to which a captured image from an image capturing apparatus, such as a camera, is input by an SDI cable or the like, or a unit to which a captured image is input as image data via an interface, such as USB and PCIe.

The first extraction unit 202 extracts a foreground area by comparing the input image 203 received by the input unit 201 and a background image based on a threshold value by the background difference method, that is, generates the first foreground silhouette image 204 representing a foreground area, which is the output of the image processing apparatus 100. The first foreground silhouette image 204 may be, for example, an image that represents the foreground area and the background area in the input image 203 by two values and whose resolution is the same as that of the input image 203, or may be an image obtained by cutting out each foreground area within the image using a circumscribed rectangle.

The parameter adjustment unit 210 performs processing to adjust a threshold value that is used in the background difference method of the first extraction unit 202 to an appropriate value.

The acquisition unit 211 has a function to receive an input image from the input unit 201 and store the input image until the processing in the parameter adjustment unit 210 to adjust the threshold value that is used in the background difference method of the first extraction unit 202 to an appropriate value is completed. In a case where the processing to adjust the threshold value to an appropriate value is completed, the acquisition unit 211 receives the input image of the frame received at that point in time by the input unit 201 and also stores the input image.

The second extraction unit 212 extracts a foreground area by a method different from that used by the first extraction unit 202 and the third extraction unit 213, that is, generates a second foreground silhouette image, which is taken as a reference. In the present embodiment, it is assumed that a foreground area extraction method by a trained model is used, which has learned to output the foreground area of the object desired to be extracted as the foreground area in the first extraction unit 202 and the third extraction unit 213 as the foreground silhouette image. As the method such as this, for example, the convolution network and the deconvolution network are used in combination, and it is possible to output foreground silhouette images of a plurality of foreground candidate areas different semantically. Semantically differing refers to being different kinds of object, for example, such as a human being and a ball. Then, according to this method, different from the foreground area extraction by the background difference method, it is possible to extract a foreground area from only the input image, and therefore, it is possible to generate a foreground silhouette image robust for the change in the image capturing environment irrespective of the threshold value. The second extraction unit 212 generates the second foreground silhouette image based on the input image stored in the acquisition unit 211 by the machine learning described previously. Here, the second foreground silhouette image may be, for example, a binary image that represents the foreground area and the background area by two values, or a multi-valued image that represents the probability of each pixel value being the foreground area. Further, it may also be possible to generate the second foreground silhouette image after performing predetermined modification for the input image stored in the acquisition unit 211. For example, a case is studied where an image obtained by cutting out each foreground area using the circumscribed rectangle in the third extraction unit 213 is generated as the foreground silhouette image. In this case, it is also possible to generate the second foreground silhouette image based on a plurality of images acquired by receiving coordinate information on each circumscribed rectangle and the like first, and then cutting out only the area corresponding to each circumscribed rectangle from the input image. It may also be possible to call the second extraction unit configured to generate the reference foreground image a reference image generation unit.

The third extraction unit 213 performs the same processing as that of the first extraction unit 202. As described previously, the first extraction unit 202 generates the first foreground silhouette image 204, which is the output of the image processing apparatus 100. In contrast to this, the third extraction unit 213 generates a third foreground silhouette image by using the threshold value updated in the parameter updating unit 216 in order to check whether the parameter calculated within the parameter adjustment unit 210 is an appropriate value. It may also be possible to call the third extraction unit configured to generate a comparison image that is the target of the comparison with the reference image a comparison image generation unit.

The highly accurate extraction unit 214 extracts only the foreground area of high accuracy from the second foreground silhouette image. For example, in a case where the second extraction unit 212 generates the second foreground silhouette image as a multi-valued image that represents the probability of being the foreground area by the machine learning, there is a possibility that the foreground area is included in the generated second foreground silhouette image, which indicates a probability by which it is not clear whether the area is the foreground area or the background area. Consequently, by delivering the second foreground silhouette image of high accuracy extracted by the highly accurate extraction unit 214 to the evaluation unit 215, it is possible to calculate a correct evaluation value. Further, the highly accurate extraction unit 214 performs processing to receive the third foreground silhouette image generated from the same frame as the frame from which the second foreground silhouette image is generated and extract the foreground area from the third foreground silhouette image so as to correspond to the area of high accuracy of the second foreground silhouette. As the method of extracting a foreground image of high accuracy, for example, there is a method in which a histogram is calculated based on the second foreground silhouette image that represents a probability of each pixel being the foreground area and only the foreground area in which the number of pixels whose probability is high exceeds a predetermined number is extracted. In a case where it is not necessary to extract an area of high accuracy, for example, such as a case where the foreground area extraction method by machine learning, which can generate a foreground silhouette image of high accuracy, is adopted, it is possible to omit the highly accurate extraction unit 214.

First, the evaluation unit 215 takes in the second foreground silhouette image extracted by the highly accurate extraction unit 214 and the third foreground silhouette image as an input. Next, the evaluation unit 215 calculates an evaluation value based on the third foreground silhouette image and the second foreground silhouette image, which are taken in, and the third extraction unit 213 evaluates whether or not an appropriate foreground area is extracted. This evaluation value is used as an index for changing the threshold value that is used in the background different method in the first extraction unit 202. As the evaluation value, for example, it is possible to use F1 score (so-called f-number), IoU (Intersection over Union) and the like, which are used frequently as an evaluation index of area division.

The parameter updating unit 216 has a function to set a threshold value to the first extraction unit 202 or the third extraction unit 213 based on the evaluation value described previously.

FIG. 3A to FIG. 3D show images as the results of extraction of the foreground area in the first extraction unit 202 and the second extraction unit 212. In an input image 301, an object that is extracted as the foreground silhouette is captured. By the processing of the second extraction unit 212, which takes the input image 301 as an input, a second foreground silhouette image 302 is generated. Similarly, by the processing of the first extraction unit 202, the first foreground silhouette image is generated. At that time, for example, in a case where the set threshold value is too large, it is not possible to sufficiently extract the actual foreground area, and therefore, a foreground silhouette image in which the foreground area is thin or lost as in an image 303 is generated. On the other hand, in a case where the threshold value is too small, the foreground area is extracted excessively, and therefore, a foreground silhouette image in which the foreground area is thick as in an image 304 is generated. In the present embodiment, by comparing the third foreground silhouette image and the second foreground silhouette image, the threshold value used in the first extraction unit 202 and the third extraction unit 213 is updated so that the foreground silhouette image becomes close to the second foreground silhouette image robust for the change in the image capturing environment. By updating the threshold value, it is made possible to generate a foreground silhouette image more appropriate than the foreground silhouette image, such as the image 303 and the image 304.

The image processing apparatus 100 receives an input image for each frame and the first extraction unit 202 generates the foreground silhouette image 204. On the other hand, as parallel processing, the parameter adjustment unit 210 acquires an input image in an arbitrary frame from the input unit 201 and the acquired input image is stored in the acquisition unit 211. The parameter is adjusted so that the value becomes appropriate for the arbitrary frame and the parameter that is used in the first extraction unit 202 is updated.

<Processing Performed by Parameter Adjustment Unit>

Figure 4:
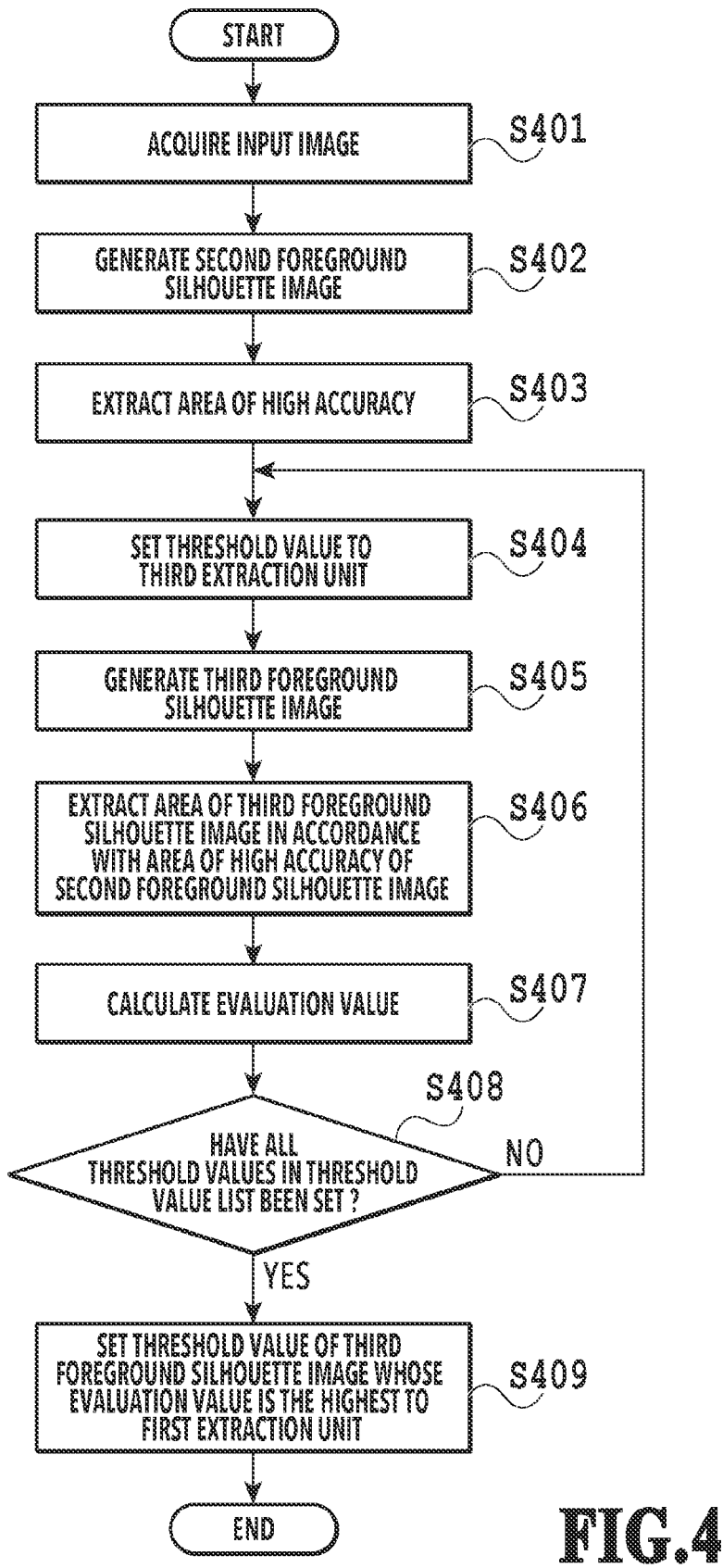
FIG. 4 is a flowchart showing a flow of each piece of processing performed by the image processing apparatus 100 in the first embodiment.

FIG. 4 is a flowchart showing a flow of each piece of processing performed by the parameter adjustment unit 210 in the image processing apparatus 100 according to the present embodiment. In the present embodiment, before performing the processing in FIG. 4, a threshold value list is prepared in advance, which includes N representative threshold values having a possibility of being set for threshold value adjustment. Then, by the third extraction unit 213 setting each value included in the threshold value list to the input image stored in the acquisition unit 211, the third foreground silhouette image corresponding to each threshold value is generated. The third foreground silhouette image and the second foreground silhouette image that are generated are compared, and the parameter updating unit 216 sets the threshold value with which the third foreground silhouette image whose evaluation value is the highest is generated to the first extraction unit 202.

At step S401, the acquisition unit 211 acquires a foreground area detection-target input image. The acquisition unit 211 receives the input image from the input unit 201 each time the processing of the parameter adjustment unit 210 is performed and stores the input image until the processing is completed. In the following, "step S-" is abbreviated to "S-".

At S402, the second extraction unit 212 generates the second foreground silhouette image by extracting the foreground area from the input image acquired at S401.

At S403, the highly accurate extraction unit 214 extracts only the foreground area of high accuracy from the second foreground silhouette image generated at S402.

At S404, the CPU 111 sets an unprocessed threshold value among the threshold values included in the threshold value list to the third extraction unit 213.

At S405, the third extraction unit 213 generates the third foreground silhouette image by extracting the foreground area from the input image acquired at S401 using the threshold value selectively set at S404.

At S406, the highly accurate extraction unit 214 extracts the foreground area from the third foreground silhouette image generated at S405. At this step, the highly accurate extraction unit 214 extracts the foreground area in accordance with the foreground area of high accuracy, which is extracted from the second foreground silhouette image at S403.

At S407, the evaluation unit 215 calculates an evaluation value by comparing the third foreground silhouette image acquired by the extraction at S406 and the second foreground silhouette image acquired by the extraction at S403.

At S408, the CPU 111 determines whether all the N threshold values included in the threshold value list are set to the third extraction unit 213. In a case where the determination results at this step are affirmative, the processing advances to S409 and on the other hand, in a case where the determination results are negative, the processing returns to S404.

At S409, the parameter updating unit 216 sets the threshold value with which the third foreground silhouette image that obtains the highest value among the evaluation values calculated at S407 is generated to the first extraction unit 202.

It may also be possible to perform the processing at S404 and S405 in parallel to the processing at S402 and S403 in the first-time processing.

Figure 5:
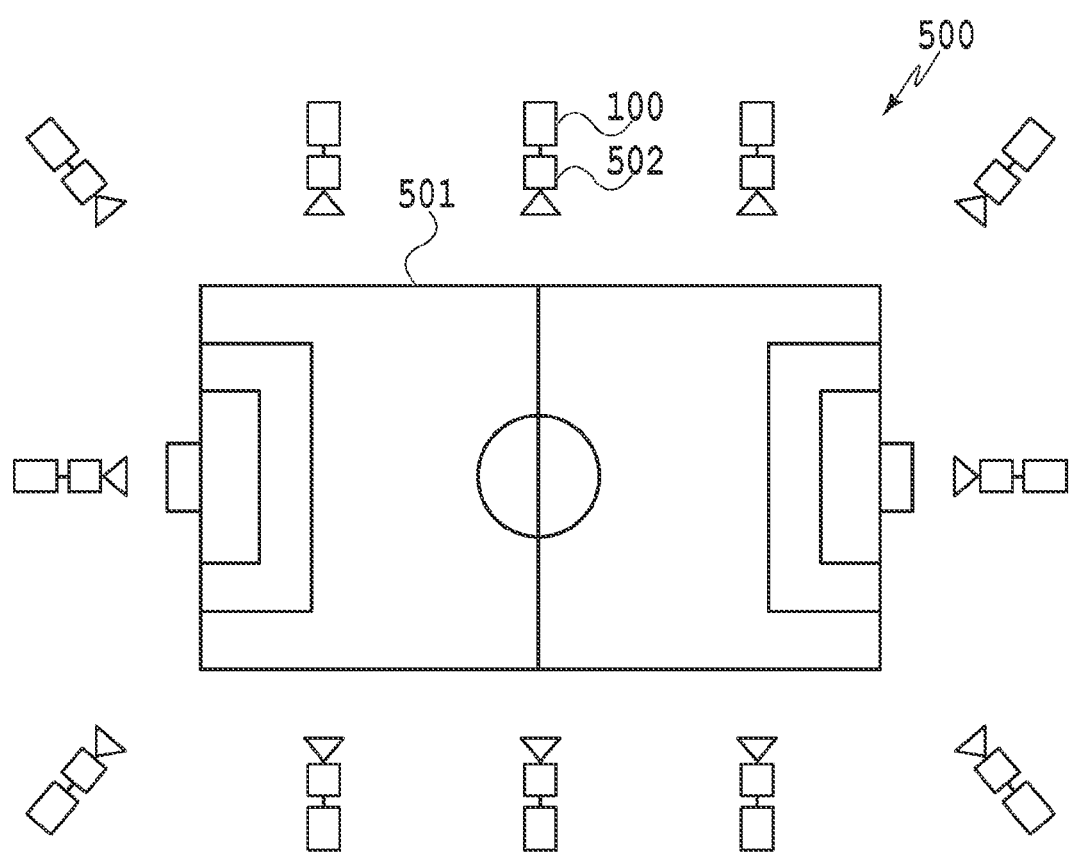
FIG. 5 is a diagram showing an application example of the image processing apparatus 100 in the first embodiment.

FIG. 5 shows an application example 500 of the image processing apparatus 100 in the present embodiment. In the application example 500, around a foreground extraction-target field 501, which is a soccer field, a plurality of image capturing apparatuses 502 is arranged and the image processing apparatus 100 is connected to each image capturing apparatus 502. The image captured by the image capturing apparatus 502 is input to the image processing apparatus 100 as the input image 203 and the foreground silhouette image 204 is output. It is possible to apply the present embodiment to, for example, the generation of a virtual viewpoint image from an arbitrary viewpoint within the field, which involves the generation of a three-dimensional model and extraction of foreground texture based on the generated foreground silhouette image 204. Further, for example, it is also possible to apply the present embodiment to the detection of a moving object, which is used for predicting a danger or the like, in a monitoring camera that is set within the area, a monitoring camera that is set at a remote position or in the outdoors, and the like.

According to the present embodiment, it is made possible to generate a foreground silhouette image robust for the change in the image capturing environment by updating the threshold value by the processing of the parameter adjustment unit 110 for each arbitrary fame while generating the foreground silhouette image for each frame.

Second Embodiment

In the first embodiment, the threshold value list storing the threshold values to be set is prepared in advance. Then, each threshold value included in the threshold value list is set to the third extraction unit and the threshold value with which the foreground silhouette image whose evaluation value is the highest among the foreground silhouette images generated by using each threshold value is generated is set to the first extraction unit.

In contrast to this, in the present embodiment, by using the evaluation value obtained as a result of evaluating the third foreground silhouette image with the second foreground silhouette image being taken as a reference, an amount of change in the threshold value is calculated and the threshold value is updated in accordance with the calculated amount of change. In the following, explanation of the contents common to those of the embodiment described previously is omitted appropriately and points different from the embodiment described previously are explained mainly.

The configuration of the image processing apparatus in the present embodiment is the same as that in the first embodiment (see FIG. 1 and FIG. 2).

<Processing Performed by Parameter Adjustment Unit>

Figure 6:
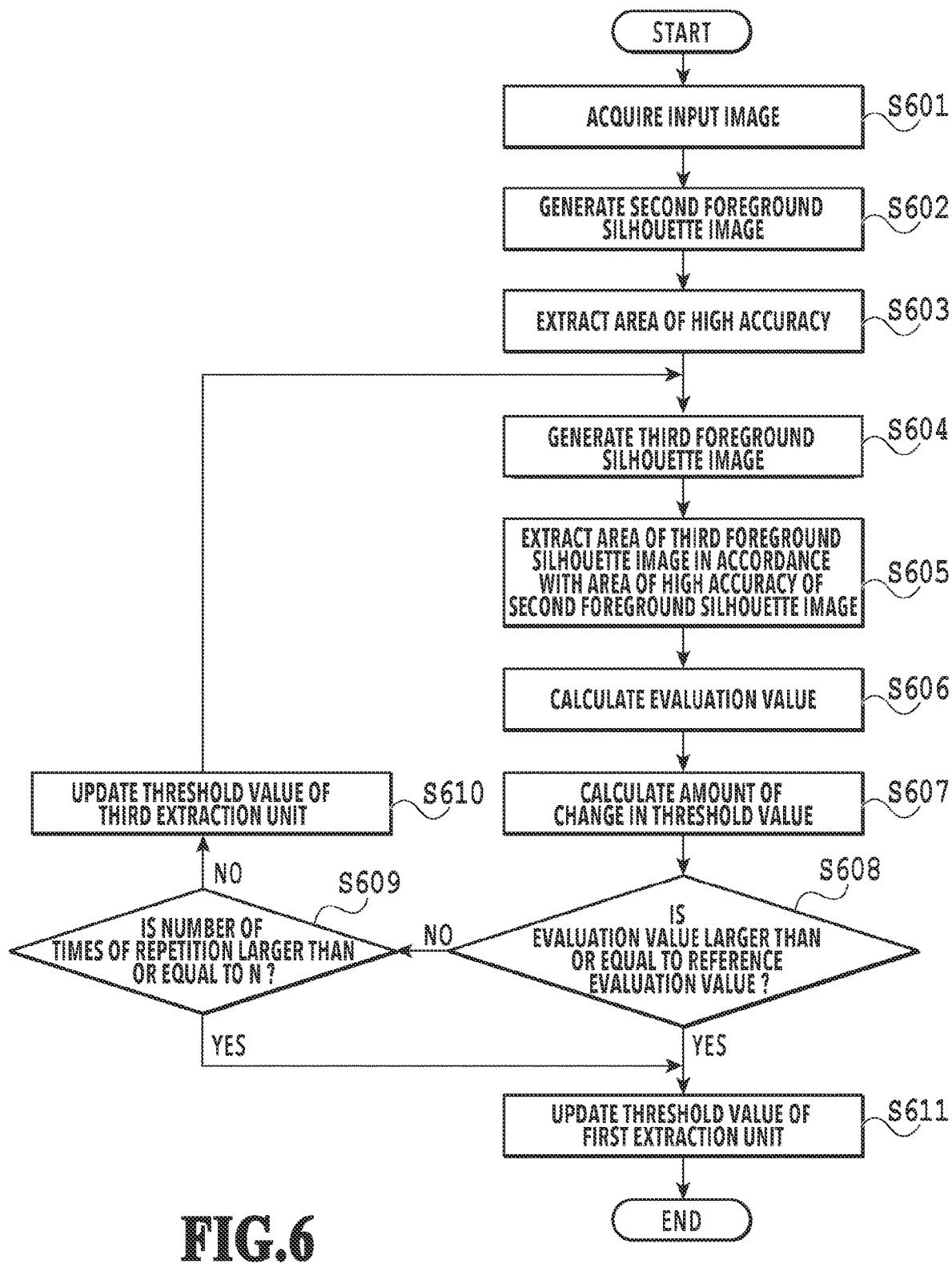
FIG. 6 is a flowchart showing a flow of each piece of processing performed by the image processing apparatus 100 in a second embodiment.

FIG. 6 is a flowchart showing a flow of each piece of processing performed by the parameter adjustment unit 210 in the image processing apparatus 100 according to the present embodiment. In the present embodiment, in the input image of the same frame, based on the evaluation results of the third foreground silhouette image, the threshold value of the first extraction unit 202 is updated appropriately.

At S601, the acquisition unit 211 acquires a foreground area detection-target input image. The acquisition unit 211 receives the input image from the input unit 201 each time the processing of the parameter adjustment unit 210 is performed and stores the input image until the processing is completed.

At S602, the second extraction unit 212 generates the second foreground silhouette image by extracting the foreground area from the input image acquired at S601.

At S603, the highly accurate extraction unit 214 extracts only the foreground area of high accuracy from the second foreground silhouette image generated at S602.

At S604, the third extraction unit 213 generates the third foreground silhouette image by extracting the foreground area from the input image acquired at S601. As the initial value of the threshold value that is used for the generation of the third foreground silhouette image, for example, it may also be possible to use the threshold value that is used for the generation of the first foreground silhouette image in the frame received at S601.

At S605, the highly accurate extraction unit 214 extracts the foreground area from the third foreground silhouette image generated at S604 in accordance with the foreground area of high accuracy, which is extracted from the second foreground silhouette image at S603.

At S606, the evaluation unit 215 calculates an evaluation value by comparing the third foreground silhouette image acquired by the extraction at S605 and the second foreground silhouette image acquired by the extraction at S603.

At S607, the CPU 111 calculates an amount of change in the threshold value based on the evaluation value calculated at S606. For example, the larger the difference in the foreground area between the third foreground silhouette image and the second foreground silhouette image, the larger the amount of change is set and the smaller the difference, the smaller the amount of change is set. In a case where it is determined that an excessive foreground area is extracted in the third foreground silhouette image, the direction in which the threshold value is changed is the direction in which the threshold value is increased. On the other hand, in a case where it is determined that even the necessary foreground area is not extracted in the third foreground silhouette image, the direction is the direction in which the threshold value is reduced.

At S608, the CPU 111 determines whether the calculated value indicates a good value (specifically, whether the evaluation value calculated at S606 is larger than or equal to the reference evaluation value) by comparing the evaluation value calculated at S606 and the reference evaluation value. In a case where the determination results at this step are affirmative, the processing advances to S611 and on the other hand, in a case where the determination results are negative, the processing advances to S609.

At S609, the CPU 111 determines whether the number of times of repetition of S604 to S607 is larger than or equal to N. In a case where the determination results at this step are affirmative, the processing advances to S611 and on the other hand, in a case where the determination results are negative, the processing advances to S610. By repeating the processing at S604 to S607, it is possible to calculate a more appropriate threshold value. However, in a case where it is not possible to calculate an appropriate value larger than or equal to the reference evaluation value even by performing the repetitive processing, there is a possibility that the repetitive processing falls into an infinite loop. Consequently, by setting the upper limit of the number of times of repetition as at this step, it is possible to terminate the repetitive processing without the repetitive processing falling into an infinite loop.

At S610, the parameter updating unit 216 sets the value obtained by changing the threshold value that is set as the threshold value used in the third extraction unit 213 at that point in time by the amount of change calculated at S607 to the third extraction unit 213 as the threshold value that is used newly in the third extraction unit 213.

At S611, the parameter updating unit 216 sets the value obtained by changing the threshold value that is set as the threshold value used in the first extraction unit 202 by the amount of change calculated at S607 to the first extraction unit 202 as the threshold value that is used newly in the first extraction unit 202.

It may also be possible to perform the processing at S604 in parallel to the processing at S602 and S603 in the first-time processing.

According to the present embodiment, it is made possible to generate a foreground silhouette image robust for the change in the image capturing environment without the need to prepare a threshold value list that is set in advance. Further, different from the first embodiment, it is not necessary to set all the threshold values in the threshold value list, and therefore, it is made possible to reduce the processing load of the parameter adjustment unit 210 compared to that of the first embodiment.

Third Embodiment

In the first embodiment and the second embodiment, before the threshold value that is used in the first extraction unit 202 is updated, the third foreground silhouette image is generated by the third extraction unit 213 and whether the value is appropriate is evaluated by using the generated third foreground silhouette image. In contrast to this, in the present embodiment, the first foreground silhouette image itself generated by the first extraction unit, which is processed for each frame, is used for evaluation.

<Function Configuration of Image Processing Apparatus>

Figure 7:
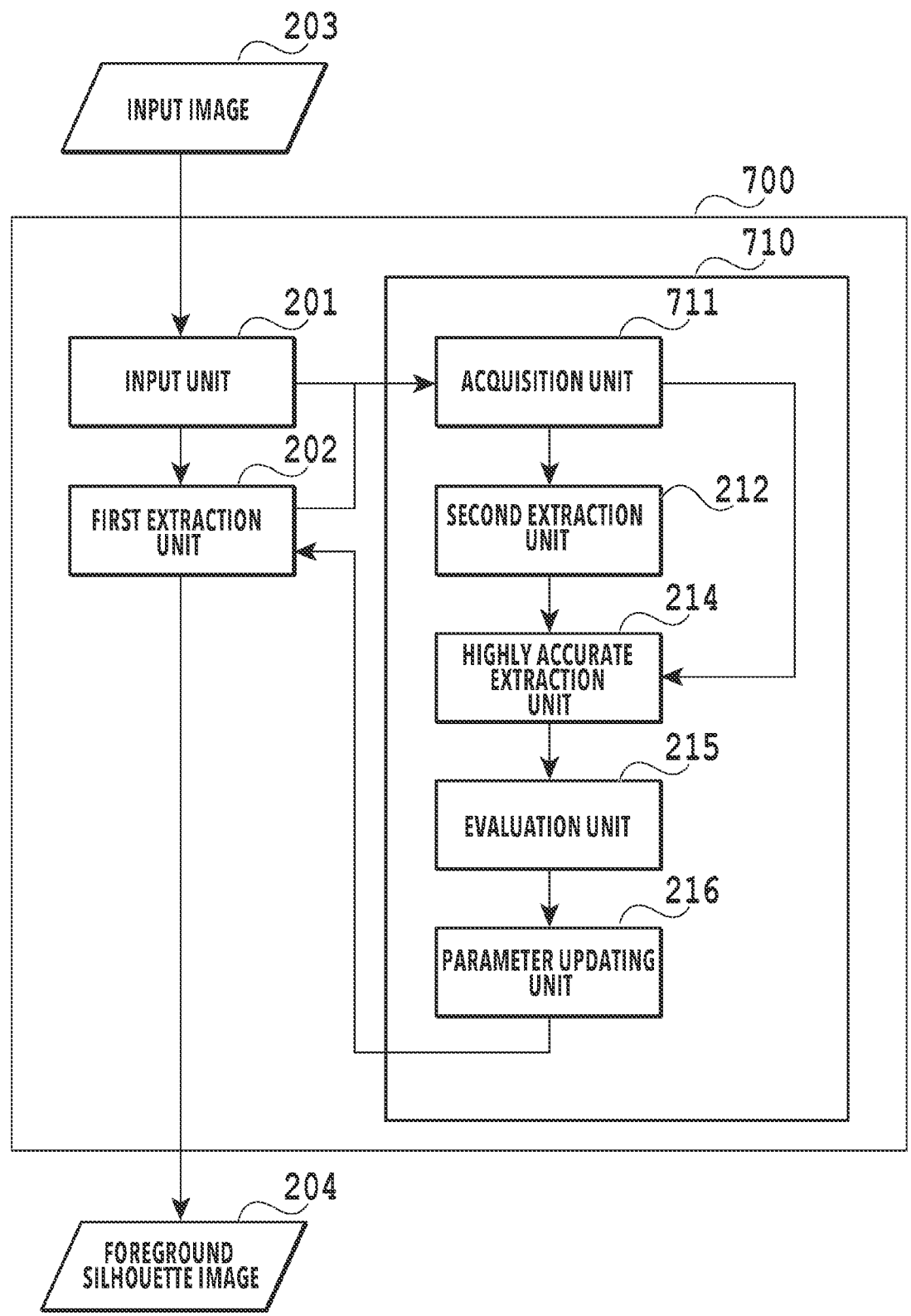
FIG. 7 is a block diagram showing a function configuration of an image processing apparatus 700 in a third embodiment.

FIG. 7 is a block diagram showing the function configuration (software configuration) of an image processing apparatus 700 in the present embodiment. The module to which the same number as that in FIG. 2 is attached has the same function as that in the first embodiment, and therefore, explanation thereof is omitted.

The image processing apparatus 700 has the input unit 201, the first extraction unit 202, and a parameter adjustment unit 710. The parameter adjustment unit 710 has an acquisition unit 711, the second extraction unit 212, the highly accurate extraction unit 214, the evaluation unit 215, and the parameter updating unit 216.

The acquisition unit 711 has a function to receive an input image from the input unit 201 and the first foreground silhouette image generated by the first extraction unit 202 based on the input image.

The image processing apparatus 700 receives the input image for each frame and generates the foreground silhouette image 204 in the first extraction unit 202. On the other hand, in the parameter adjustment unit 710, the parameter is adjusted so as to become an appropriate parameter for each arbitrary frame and the parameter that is used in the first extraction unit 202 is updated.

<Processing Performed by Parameter Adjustment Unit>

Figure 8:
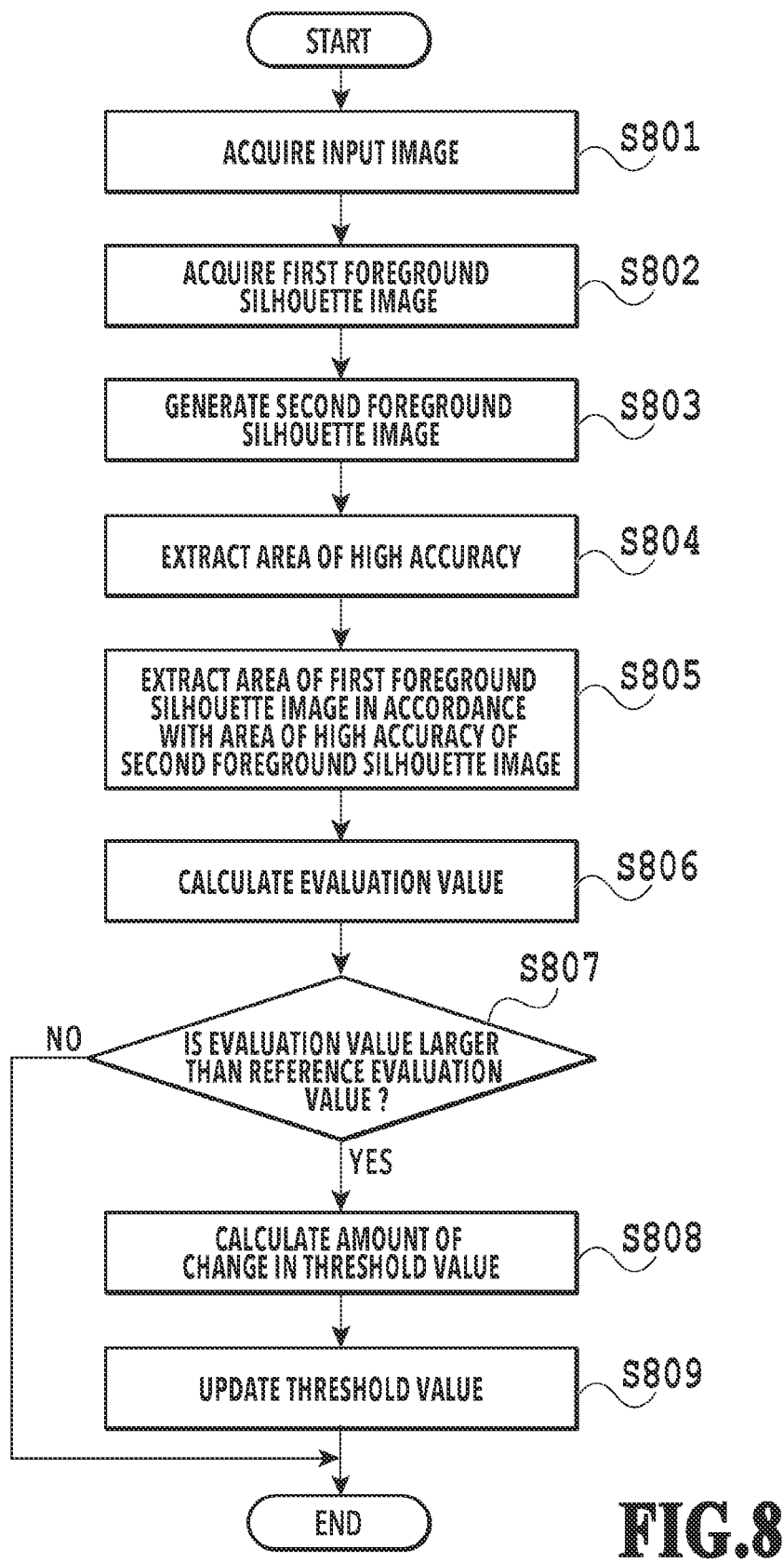
FIG. 8 is a flowchart showing a flow of each piece of processing performed by the image processing apparatus 700 in the third embodiment.

FIG. 8 is a flowchart showing a flow of each piece of processing performed by the parameter adjustment unit 710 in the image processing apparatus 700 according to the present embodiment.

At S801, the acquisition unit 711 acquires a foreground area detection-target input image delivered from the input unit 201.

At S802, the acquisition unit 711 receives the first foreground silhouette image generated by the first extraction unit 202 based on the input image acquired at S801.

At S803, the second extraction unit 212 generates the second foreground silhouette image by extracting the second foreground area from the input image acquired at S801.

At S804, the highly accurate extraction unit 214 extracts only the foreground area of high accuracy from the second foreground silhouette image generated at S803.

At S805, the highly accurate extraction unit 214 extracts the foreground area from the first foreground silhouette image acquired at S802. At this step, the highly accurate extraction unit 214 extracts the foreground area in accordance with the foreground area of high accuracy extracted from the second foreground silhouette image at S804.

At S806, the evaluation unit 215 calculates an evaluation value for calculating the amount of change in the threshold value by comparing the first foreground silhouette image acquired by the extraction at S805 and the second foreground silhouette image acquired by the extraction at S804.

At S807, the CPU 111 determines whether the calculated evaluation value indicates a good value (specifically, whether the evaluation value calculated at S806 is larger than the reference evaluation value) by comparing the evaluation value calculated at S806 and the evaluation value that is set in advance and which is used as a reference. In a case where the determination results at this step are affirmative, the processing advances to S808 and on the other hand, in a case where the determination results are negative, the series of processing is terminated.

At S808, the CPU 111 calculates the amount of change in the threshold value based on the evaluation value calculated at S806.

At S809, the parameter updating unit 216 sets the value obtained by changing the threshold value that is set as the threshold value used in the first extraction unit 202 at that point in time by the amount of change calculated at S808 to the first extraction unit 202 as the threshold value that is used newly in the first extraction unit 202. It is not necessarily possible to set an optimum threshold value at step S809 by simply performing the flow in FIG. 8 once. It is possible to calculate and set an optimum threshold value for the first extraction unit by performing the flow for a plurality of frames.

It may also be possible to perform the processing at S802 in parallel to the processing at S803 and S804.

As described previously, the processing in the third extraction unit, which exists in the first embodiment and the second embodiment, no longer exists in the present embodiment. Consequently, it is made possible to reduce the processing load in the parameter adjustment unit.

Other Embodiments

What can be adjusted by the parameter adjustment unit is not limited to the threshold value that is used for the background difference method. For example, it is also possible for the parameter adjustment unit to adjust the parameter that is used at the time of modifying the generated foreground silhouette image so as to become closer to the actual foreground area image.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™™), a flash memory device, a memory card, and the like.

According to the present disclosure, it is made possible to extract a foreground area accurately.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-088126, filed May 20, 2020, which is hereby incorporated by reference wherein in its entirety.

What is claimed is:

1. An image processing apparatus comprising:
one or more memories storing instructions; and
one or more processors executing the instructions to:
generate a reference image of a foreground by extracting a foreground area from a captured image by learning;
generate a comparison image for comparing with the reference image by extracting a foreground area from the captured image based on a difference between the captured image and a background image and a threshold value that is selectively set from a plurality of threshold values having a possibility of being set in threshold value adjustment;
determine, based on the reference image and the comparison image, a threshold value that is used for generation of a foreground image based on a difference between the captured image and the background image corresponding to the captured image; and
generate a foreground image based on a difference between the captured image and the background image and the determined threshold value.

2. The image processing apparatus according to claim 1, wherein
an evaluation value for evaluating whether an appropriate foreground area is extracted in the comparison image is calculated based on the reference image and the comparison image,
wherein the threshold value is determined based on the evaluation value.

3. The image processing apparatus according to claim 2, wherein
the evaluation value is calculated for each of the plurality of threshold values and
the foreground image is generated based on a difference between the captured image and the background image and a threshold value corresponding to the highest evaluation value among the calculated evaluation values.

4. The image processing apparatus according to claim 2, wherein the one or more processors execute the instructions further to:
extract an area corresponding to an extracted foreground area of higher accuracy than the foreground area which is represented by the reference image from the comparison image as well as extracting the foreground area of the higher accuracy from the reference image; and
the evaluation value is calculated based on a highly accurate foreground area extracted from the reference image and a highly accurate foreground area extracted from the comparison image.

5. The image processing apparatus according to claim 4, wherein the reference image is an image that represents a probability of each pixel value being a foreground area, and
a histogram is obtained based on the reference image and only a foreground area whose number of pixels having a probability of being a foreground area which is larger than a predetermined threshold is extracted as the foreground area of the higher accuracy based on the obtained histogram.

6. The image processing apparatus according to claim 2, wherein the one or more processors execute the instructions further to:
update the threshold value used in a case where the foreground image is generated and the threshold value used in a case where the comparison image is generated.

7. The image processing apparatus according to claim 6, wherein the one or more processors execute the instructions further to:
calculate an amount of change for the threshold value used in a case where the comparison image is generated based on the evaluation value, and
the threshold value used in a case where the comparison image is generated is updated in accordance with the calculated amount of change.

8. An image processing method comprising:
generating a reference image of a foreground by extracting a foreground area from a captured image by learning;
generating a comparison image for comparing with the reference image by extracting a foreground area from the captured image based on a difference between the captured image and a background image and a threshold value that is selectively set from a plurality of threshold values having a possibility of being set in threshold value adjustment;
determining, based on the reference image and the comparison image, a threshold value that is used for generation of a foreground image based on a difference between the captured image and a background image corresponding to the captured image; and
generating a foreground image based on a difference between the captured image and the background image and the determined threshold value.

9. A non-transitory computer readable storage medium storing a program for causing a computer to perform an image processing method comprising:

generating a reference image of a foreground by extracting a foreground area from a captured image by learning;

generating a comparison image for comparing with the reference image by extracting a foreground area from the captured image based on a difference between the captured image and a background image a threshold value that is selectively set from a plurality of threshold values having a possibility of being set in threshold value adjustment;

determining, based on the reference image and the comparison image, a threshold value that is used for generation of a foreground image based on a difference between the captured image and a background image corresponding to the captured image; and generating a foreground image based on a difference between the captured image and the background image and the determined threshold value.

\* \* \* \* \*